United States Patent
Kohlenberg et al.

(10) Patent No.: US 9,094,700 B2
(45) Date of Patent: Jul. 28, 2015

(54) DYNAMICALLY IMPLEMENTING AN IMAGE PROTECTION POLICY

(71) Applicant: Intel Corporation, Santa Clara, CA (US)

(72) Inventors: Tobias M. Kohlenberg, Portland, OR (US); Rita H. Wouhaybi, Portland, OR (US); Mubashir A. Mian, Santa Clara, CA (US); Stanley Mo, Hillsboro, OR (US); Jim S. Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,778

(22) PCT Filed: Mar. 14, 2013

(86) PCT No.: PCT/US2013/031370
§ 371 (c)(1),
(2) Date: Jun. 25, 2013

(87) PCT Pub. No.: WO2014/142880
PCT Pub. Date: Sep. 18, 2014

(65) Prior Publication Data
US 2014/0282679 A1    Sep. 18, 2014

(51) Int. Cl.
*H04N 21/4623* (2011.01)
*H04N 21/254* (2011.01)
*H04N 21/235* (2011.01)
*H04N 1/00* (2006.01)

(52) U.S. Cl.
CPC ....... *H04N 21/2541* (2013.01); *H04N 1/00127* (2013.01); *H04N 21/2353* (2013.01)

(58) Field of Classification Search
CPC .................................................... H04N 21/4623
USPC .......................................................... 725/25
See application file for complete search history.

(56) References Cited

U.S. PATENT DOCUMENTS

2006/0159440 A1* 7/2006 Purkayastha et al. ........... 396/89
2008/0005561 A1    1/2008 Brown et al.
(Continued)

FOREIGN PATENT DOCUMENTS

WO    2013147902 A1    10/2013

OTHER PUBLICATIONS

International Search Report and Written Opinion received for PCT Patent Application No. PCT/US2013/031370, mailed on Dec. 11, 2013, 13 pages.
(Continued)

*Primary Examiner* — Jefferey Harold
*Assistant Examiner* — Sihar Karwan
(74) *Attorney, Agent, or Firm* — Barnes & Thornburg LLP

(57) ABSTRACT

Technologies for dynamically implementing an image protection policy include a camera device with a camera to capture an image of at least one person. The camera device determines a location in the image of at least one person in the image, determines a location of at least one personal computing device, and maps the personal computing devices to the persons captured in the image based on the determined device and image locations. The camera device may broadcast an announcement of the creation of the image to the personal computing devices, negotiate an image protection policy with each of the personal computing devices, and implement the negotiated image protection policy.

25 Claims, 9 Drawing Sheets

(56) References Cited

U.S. PATENT DOCUMENTS

2008/0304715 A1* 12/2008 Ishida .......................... 382/118
2009/0080181 A1* 3/2009 Gallagher .................... 362/103
2010/0149782 A1* 6/2010 Smith et al. ..................... 362/3
2010/0194896 A1* 8/2010 Heimendinger ........... 348/207.1
2011/0268423 A1* 11/2011 Ge .............................. 386/244

2012/0295596 A1 11/2012 Camulli et al.

OTHER PUBLICATIONS

McAfee, Inc., "McAfee Safeguards Facebook Photos With McAfee Social Protection," retrieved from: <http://www.mcafee.com/us/about/news/2012/q3/20120828-01.aspx>, Aug. 28, 2012, 1 page.

* cited by examiner

| PERSON | LOCATION | PERSONAL DEVICE | POLICY |
|---|---|---|---|
| A | X | B | OPEN |
| B | Y | A | BLUR |
| C | Z | C | DELIVER COPY |
| D | W | | OPEN |
| | | | BLUR PERSON B COPY PERSON C |

FIG. 8

DYNAMICALLY IMPLEMENTING AN IMAGE PROTECTION POLICY

BACKGROUND

In today's society of smartphones, small form factor personal computing devices, and social media, pictures are constantly being taken and electronically distributed among various computing devices. Oftentimes, pictures are taken of someone and posted, for example, to a social media website without the consent of that person. Digital rights management systems and policies have been developed in an effort to prevent misuse of such images and other digital files. Digital rights management systems may be applied to an existing digital file to dictate whether it may be, for example, distributed, copied, saved, or printed.

Additionally, smartphones, digital cameras, and other handheld electronic devices are becoming computationally robust. For example, cameras with multiple lenses (e.g., 3D cameras) are equipped with additional features and able to determine depth when capturing an image. Additionally, such small form factor personal computing devices may include hardware to implement a variety of communication protocols, technologies, and techniques. For example, such devices may be able to triangulate another device to determine its location.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 8 is a simplified chart of at least one embodiment of a resultant image protection policy and associated persons-to-personal computing devices mappings.

DETAILED DESCRIPTION OF THE DRAWINGS

Figure 1:
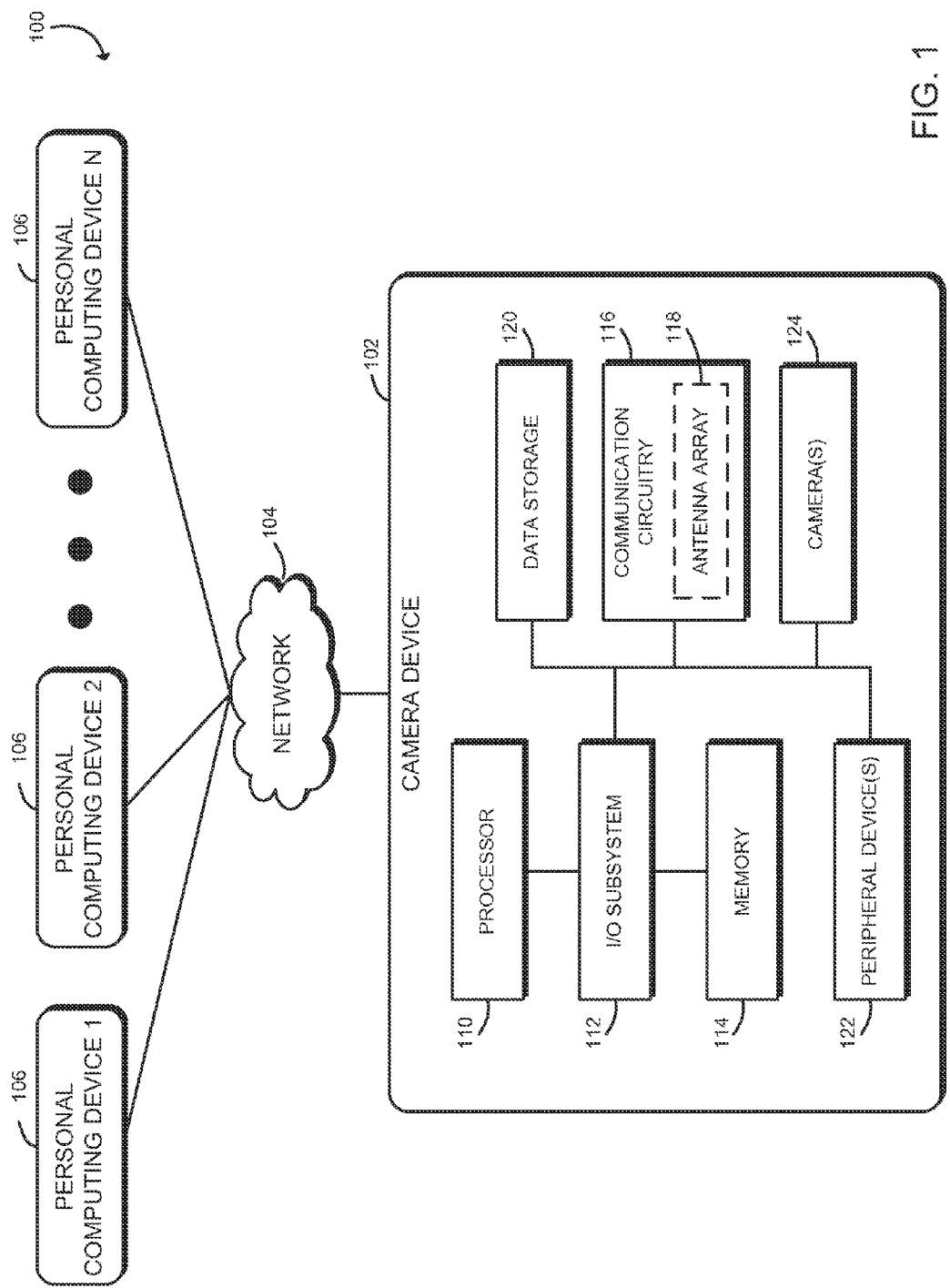
FIG. 1 is a simplified block diagram of at least one embodiment of a system for dynamically implementing an image protection policy of FIG. 1.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g. a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for dynamically implementing an image protection policy includes a camera device 102, a network 104, and at least one personal computing device 106. In use, as discussed in more detail below, a user 202 may operate the camera device 102 to capture an image of one or more persons 204, some of whom may be carrying or using a corresponding personal computing device 106 (see, e.g., FIG. 2). After capturing the image, the camera device 102 determines the location of each person 204 in the image and the locations of the nearby personal computing devices 106. Based on the image locations of the persons 204 and the locations of the nearby personal computing devices 106, the camera device 102 maps each personal computing device 106 to one of the persons 204 captured in the image. Additionally, the camera device 102 negotiates an image protection policy with each of the mapped personal computing devices 106 and subsequently implements the negotiated image protection policy (e.g. by modifying the image, modifying metadata of the image, distributing the image, etc.).

Figure 2:
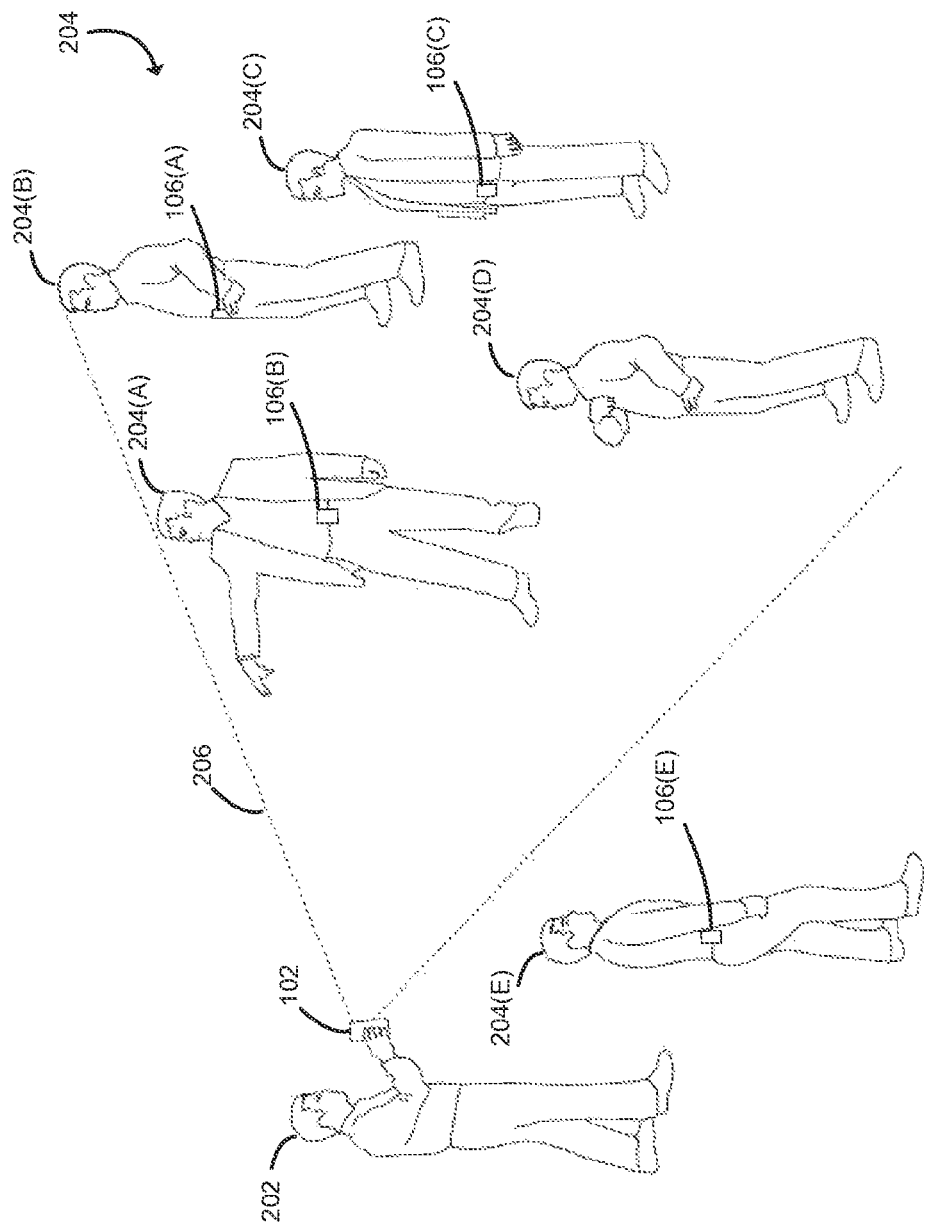
FIG. 2 is a simplified illustration of at least one embodiment of the system of FIG. 1 in use.

For example, as shown in FIG. 2, a user 202 may capture an image of one or more persons 204 using the camera device 102. Of course, because the person 204(E) is outside a field of view 206 of the camera device 102, the person 204(E) will not be included in the captured image (e.g. see FIG. 9). Each of the persons 204 may or may not have a corresponding personal computing device 106. For example, in the illustrative embodiment of FIG. 2, each of the persons 204(A), 204(B)

and 204(C) has a corresponding personal computing device 106(B), 106(A), and 106(C), while person 204(D) does not. As discussed above, the camera device 102 maps each of the personal computing devices 106 to a particular person 204 within the field of view 206 of the camera device 102 based on the determined relative location of the personal computing devices 106 and the corresponding persons 204. For example, the personal computing device 106(B) and the person 204(A) are in approximately the same location relative to the camera device 102, and as such are mapped to one another. Similarly, the personal computing device 106(A) and the person 204(B) are mapped to one another. Additionally, as discussed below, because the personal computing device 106(E) is outside the field of view 206 of the camera device 102, the personal computing device 106(E) is not mapped to any person 204 within the image (i.e., within the field of view 206). Additionally, because the person 204(D) does not have a personal computing device 106 on his person (or it is not powered on or otherwise communicatively identifiable), the camera device 102 may assign an image protection policy (e.g., based on a default policy or user input) for the image of the person 204(D) as discussed in more detail below.

Referring back to FIG. 1, the camera device 102 may be embodied as any type of camera device or computing device capable of capturing an image, establishing a communication link with the personal computing devices 106, and performing the functions described herein. For example, the camera device 102 may be embodied as a smart camera, cellular phone, smartphone, tablet computer, laptop computer, personal digital assistant, mobile Internet device, desktop computer, and/or any other computing/communication device. As shown in FIG. 1, the illustrative camera device 102 includes a processor 110, an input/output ("I/O") subsystem 112, a memory 114, a communication circuitry 116, a data storage 120, one or more peripheral devices 122, and one or more cameras 124. Of course, the camera device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the camera device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the camera device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the camera device 102, on a single integrated circuit chip.

The communication circuitry 116 of the camera device 102 may be embodied as any communication circuit, device, or collection thereof, capable of enabling communications between the camera device 102 and other remote devices (e.g., the personal computing devices 106) over the network 104. The communication circuitry 116 may be configured to use any one or more communication technologies (e.g., wireless or wired communications) and associated protocols (e.g., Ethernet, Bluetooth®, Wi-Fi®, WiMAX, etc.) to effect such communication. In some embodiments, the communication circuitry 115 includes near-field communication (NFC) circuitry for short range communication such as radio frequency identification (RFID) and other near-field communication technologies. In some embodiments, the communication circuitry 116 includes an antenna array 118 including two or more antennae. The antennae of the antenna array 118 may be arranged in any way suitable to perform the functions described herein. In particular, the antennas of antenna array 118 may be arranged or otherwise positioned to facilitate the determination of the location of the personal computing devices 106 based on signals reviewed therefrom (e.g., via triangulation).

The data storage 120 may be embodied as any type of device or devices configured for short-term or long-term storage of data such as, for example, memory devices and circuits, memory cards, hard disk drives, solid-state drives, or other data storage devices. The one or more peripheral devices 122 of the camera device 102 may include any number of additional peripheral or interface devices. The particular devices included in the peripheral devices 122 may depend on, for example, the type and/or intended use of the camera device 102.

The camera(s) 224 may be embodied as a peripheral or integrated device suitable for capturing images, such as a still camera, a video camera, a webcam, or other device capable of capturing video and/or images. As discussed below, in some embodiments, the camera(s) 224 enable, or otherwise facilitate, the camera device 102 to determine the location of the persons 204 captured in the image (e.g., by determining depth). For example, in one embodiment, the camera 124 is embodied as a three dimensional (3D) camera or otherwise includes more than one camera lens, such that each lens has a separate image sensor. Of course, in some embodiments, multiple cameras 224 may be used to capture images of the persons, for example, from different perspectives.

The network 104 may be embodied as any type of telecommunication network capable of facilitating communication between the camera device 102 and the personal computing devices 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof. In the illustrative embodiment, the network 104 is embodied as a short-range communication network or link and may be, in some embodiments, an ad hoc network.

The personal computing devices 106 may be embodied as any type of computing device capable of performing the functions described herein. For example, in some embodiments, the personal computing devices 106 may be similar to the camera device 102 as described above. That is, the personal computing devices 106 may be embodied as a smart camera, cellular phone, smartphone, tablet computer, laptop computer, personal digital assistant, mobile Internet device, and/or any other computing/communication device. Further, the personal computing device 106 may include components similar to those of the camera device 102 discussed above. The description of those components of the camera device 102 is equally applicable to the description of components of the personal computing devices 106 and is not repeated herein for clarity of the description. Further, it should be appreciated that the personal computing devices 106 may include other components, sub-components, and devices commonly found in a computing device, which are not discussed above in reference to the camera device 102 and not discussed herein for clarity of the description. Additionally, the personal computing devices 106 may include components different from, or less than, those of the camera device 102. For example, each personal computing device 106 may or may not include a camera similar or dissimilar to the camera 124. As illustratively shown in FIG. 1, the system 100 may include one, two or more personal computing devices 106. Additionally, although only one camera device 102 and one network 104 are illustratively shown in FIG. 1, the system 100 may include additional camera devices 102 and/or networks 104 in some embodiments.

Figure 3:
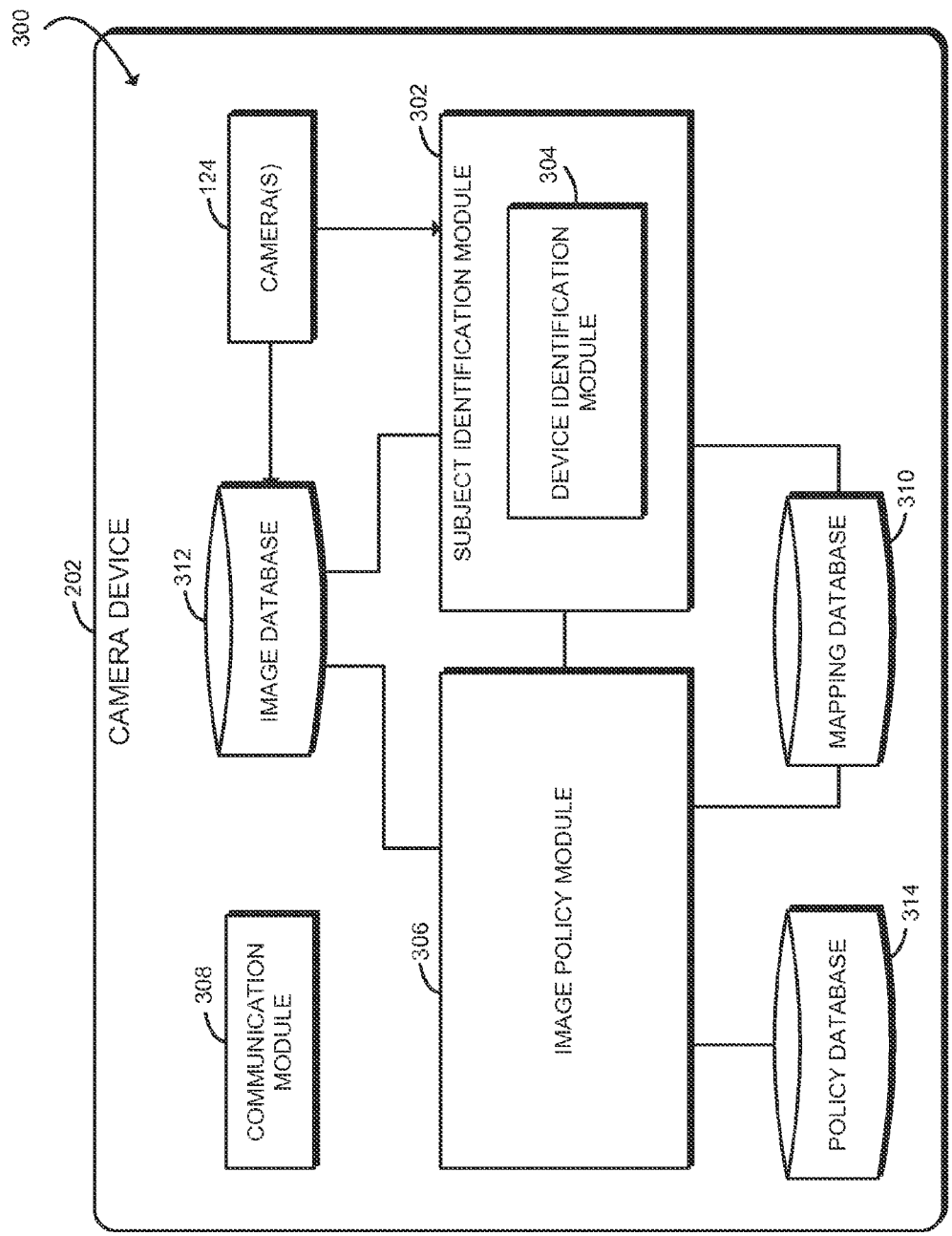
FIG. 3 is a simplified block diagram of at least one embodiment of an environment of a camera device of the system of FIG. 1.

Referring now to FIG. 3, in use, the camera device 102 of the system 100 establishes an environment 300 for dynamically implementing an image protection policy. The environment 300 in the illustrative embodiment includes a subject identification module 302, an image policy module 306, a communication module 308, a mapping database 310, an image database 312, and a policy database 314. Additionally, the subject identification module 302 further includes a device identification module 304. Each of the subject identification module 302, the device identification module 304, the image policy module 306, and the communication module 308 may be embodied as hardware, software, firmware, or a combination thereof.

As discussed in more detail below, the subject identification module 302 determines the location of the persons 204 captured in the image generated by the camera 124. In doing so, the subject identification module 302 may receive the captured image(s) from the camera(s) 124. As discussed above, in one embodiment, a 3D or other multi-lens camera is used, which permits the subject identification module 302 to determine depth and identify the three dimensional location of the persons 204 relative to the camera device 102. In some embodiments, the subject identification module 302 may determine the location of the persons 204 relative to one another. For example, the subject identification module 302 may determine that, in an image of five people, there are three people in a back row and two people in a front row. In such an example, the subject identification module 302 may further infer the relative distances of each person 204 to the camera device 102 (e.g. by inferring that the persons 204 in the front row are closer to the camera device 102 than those in the back row). Of course, in some embodiments, the camera device 102 may also infer distances of the persons 204 relative to the camera device 102. Further, in some embodiments as discussed below, the subject identification module 302 may perform a facial recognition analysis on one or more of the persons 204 in the captured image. Additionally, the camera(s) 228 may store the captured images in the image database 312, which may be retrieved by the subject identification module 302 and/or the image policy module 306.

The device identification module 304 determines the location of the personal computing devices 106 within the field of view 206 of the camera device 102. To do so, the device identification module 304 may identify the personal computing devices 106 within communication range of the camera device 102 and filter out or otherwise ignore those outside the field of view 206 of the camera device 102. It should be appreciated that the field of view 206 of the camera device 102 may be predetermined by the camera device 102 (e.g., in the device specification) or determined as a function of current parameters of the camera device 102 and/or derived from the generated image.

Based on the determination of the relative location of the personal computing devices 106, the subject identification module 302 may map the personal computing devices 106 to the persons 204 based on each persons determined image location. Further, in some embodiments, the subject identification module 302 may save the mapping to the mapping database 310 for later use. For example, in some embodiments, the subject identification module 302 may perform a facial recognition analysis of a particular person 204 and save the mapping of that person 204 to the associated personal computing device 106 in the mapping database 310 in association with the facial recognition data. As such, if the subject identification module 302 subsequently recognizes the face of that person 204, the subject identification module 302 may retrieve data identifying the personal computing device 106 from the mapping database 310.

The image policy module 306 may negotiate an image protection policy with one, some, or all of the personal computing devices 106. To do so, the camera device 102 may broadcast an announcement of the creation of the image to the personal computing devices 106. In other words, the camera device 102 indicates to the personal computing devices 106 that the image has been, or will be, captured. As discussed in detail below, in negotiating the image protection policy, the image policy module 306 receives an image protection policy from each of the mapped personal computing devices 106 for which a policy is not already saved in the policy database 314. In some embodiments, the image policy module 306 stores the image protection policies of the personal computing devices 106 in the policy database 314 when received so that they may be subsequently retrieved (e.g., based on person or device identification). The image policy module 306 may determine a resultant or negotiated policy based on the retrieved image protection policies. In doing so, the image policy module 306 may resolve any conflicts among the policies.

The communication module 308 handles the communication between the camera device 102 and remote devices (e.g., the personal computing devices 106) through the network 104. For example, as discussed below, the communication module 308 may transmit interrogation signals to the personal computing devices 106 and receive their responses in determining the locations of the personal computing devices 106. Additionally, the communication module 308 may broadcast an image creation announcement to the personal computing devices 106 and communicate with the personal computing devices 106 to negotiate an image protection policy. Further, in some embodiments, the communication module 308 may transmit a copy of the protected image to one or more of the personal computing devices 106.

Figure 4:
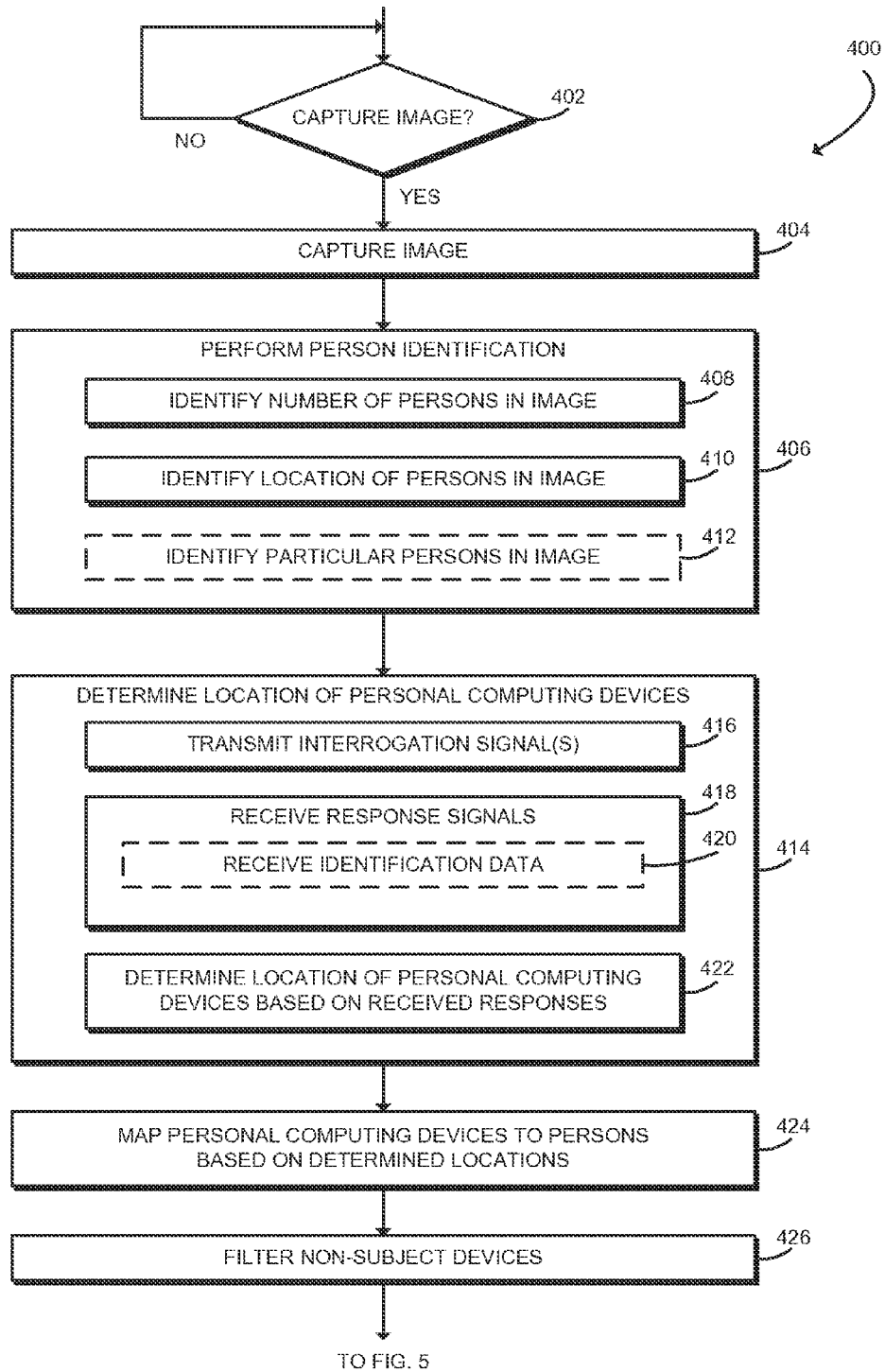
FIGS. 4 and 5 is a simplified flow diagram of at least one embodiment of a method for dynamically implementing an image protection policy on the camera device of the system of FIG. 1.

Referring now to FIG. 4, in use, the camera device 102 of the system 100 may execute a method 400 for dynamically implementing an image protection policy. The illustrative method 400 begins with block 402 in which the camera device 102 determines whether an image of one or more persons 204 is to be captured. If so, the camera device 102 captures the image in block 404. In block 406, the camera device 102 identifies the persons 204 in the captured image. In doing so, the camera device 102 identifies the number of persons in the image in block 408 and identifies the location of the persons in the image in block 410. Of course, in some embodiments, the camera device 102 identifies the number and location of the persons as parts of the same analysis (e.g., concurrently). As discussed above, the camera device 102 may determine the number of persons 204 in the captured image using any suitable algorithm or technique. For example, the camera device 102 may identify how many faces of persons appear in the image using edge detection, facial recognition, or other suitable process. Similarly, it should be appreciated that the camera device 102 may identify the location of each person in the image using any suitable means. For example, as discussed above, in one embodiment, the camera device 102 may include a 3D camera 124, which may be used to identify the three dimensional location of the persons 204 in the image. In another embodiment, the camera device 102 may identify the relative location of the persons 204 to one another and use that information to identify the actual or approximate three dimensional location of the persons 204 relative to the camera device 102. Of course, in some embodiments, the camera device 102 may use, for example, location data of the camera device 102 and the relative locations of the persons 204 to determine an approximate actual location of the persons 204.

In some embodiments, the camera device 102 may additionally identify the particular persons 204 in the captured image in block 412. In some embodiments, the camera device 102 may implement a facial recognition algorithm and, for example, compare the facial recognition data of the person to data stored in the mapping database 310 or some other internal or external database to identify one or more persons in the captured image.

In block 414, the camera device 102 determines the location of personal computing devices in the vicinity of the camera device 102. In doing so, the camera device 102 may transmit an interrogation signal to the personal computing devices 106 in block 416. For example, the camera device 102 may broadcast a signal to all nearby personal computing devices 106 to generate a response from the personal computing devices 106. It should be appreciated that the communication range of the interrogation signal may vary depending on the particular personal computing device 106, the type of communication circuitry 116, the particular communication protocol used, and/or other factors. In block 418, the camera device 102 receives response signals from the personal computing devices 106 within communication range of the camera device 102. The response signals may be embodied as any type of suitable response signal and may, in some embodiments, include identification data as shown in block 420. Such identification data may be embodied as data identifying the person 204 who owns the personal computing device 106, the particular personal computing device 106, a mapping between the person 204 and the personal computing device 106, or other identification data.

In block 422, the camera device 102 determines the location of the nearby personal computing devices 106 based on the received responses. For example, in some embodiments, the camera device 102 may determine the location of a particular personal computing device 106 based on antennae signals received from the personal computing device 106 by at least two antennae of the antenna array 118 using a triangulation or similar technique. In other embodiments, the camera device 102 may determine the location of a particular personal computing device 106 based on absolute location data received from the personal computing device 106 via the response signal. For example, each personal computing device 106 may transmit global positioning system (GPS) data or other location data to the camera device 102.

In block 424, the camera device 102 maps the responding personal computing devices 106 to the persons 204 based on the corresponding determined locations. That is, the camera device 102 correlates the locations of the persons 204 in the captured image to the determined locations of the personal computing devices 106. For example, if a location of a person 204 and a location of a personal computing device 106 are in the same approximate location relative to the camera device 102 or in the same absolute location, the person 204 and the personal computing device 106 are mapped to or associated with one another. In other words, a personal computing device 106 located at the same location as a person 204 is treated as though it belongs to the person 204. As discussed in detail below, the camera device 102 may then negotiate with that personal computing device 106 an image protection policy for that person 204. In the simplest example, each person 204 in the communicative range of the camera device 102 is within the field of view 206 of the camera 124 and has a personal computing device 106 on his person. In such an example, the camera device 102 may determine a objective function that relates each person 204 to a personal computing device 106 based on similar locations. As discussed above, the mapping may be represented in any suitable way and may be stored, for example, in the mapping database 310.

In determining the location of the personal computing devices 106, the camera device 102 may receive responses from all nearby computing devices. Accordingly, some of those responses may be from computing devices 106 outside the field of view 206 of the camera 124 of the camera device 102 (e.g., personal computing device 106(E) of FIG. 2). Thus, in block 426, the non-subject computing devices (i.e., computing devices outside the field of view 206) are filtered or ignored. It should be appreciated that, in some embodiments, filtering the non-subject computing devices may be performed prior to or as part of mapping the persons 204 and the personal computing devices 106. Additionally, in some embodiments, more personal computing devices 106 may be in the field of view 206 of the camera 124 than persons 204. For example, one person 204 may have multiple personal computing device 106 and/or a personal computing device 106 may be lain on a table or chair in the field of view 206. Accordingly, in some embodiments, the camera device 102 filters or ignores those personal computing devices 106 using any suitable algorithm.

Figure 5:
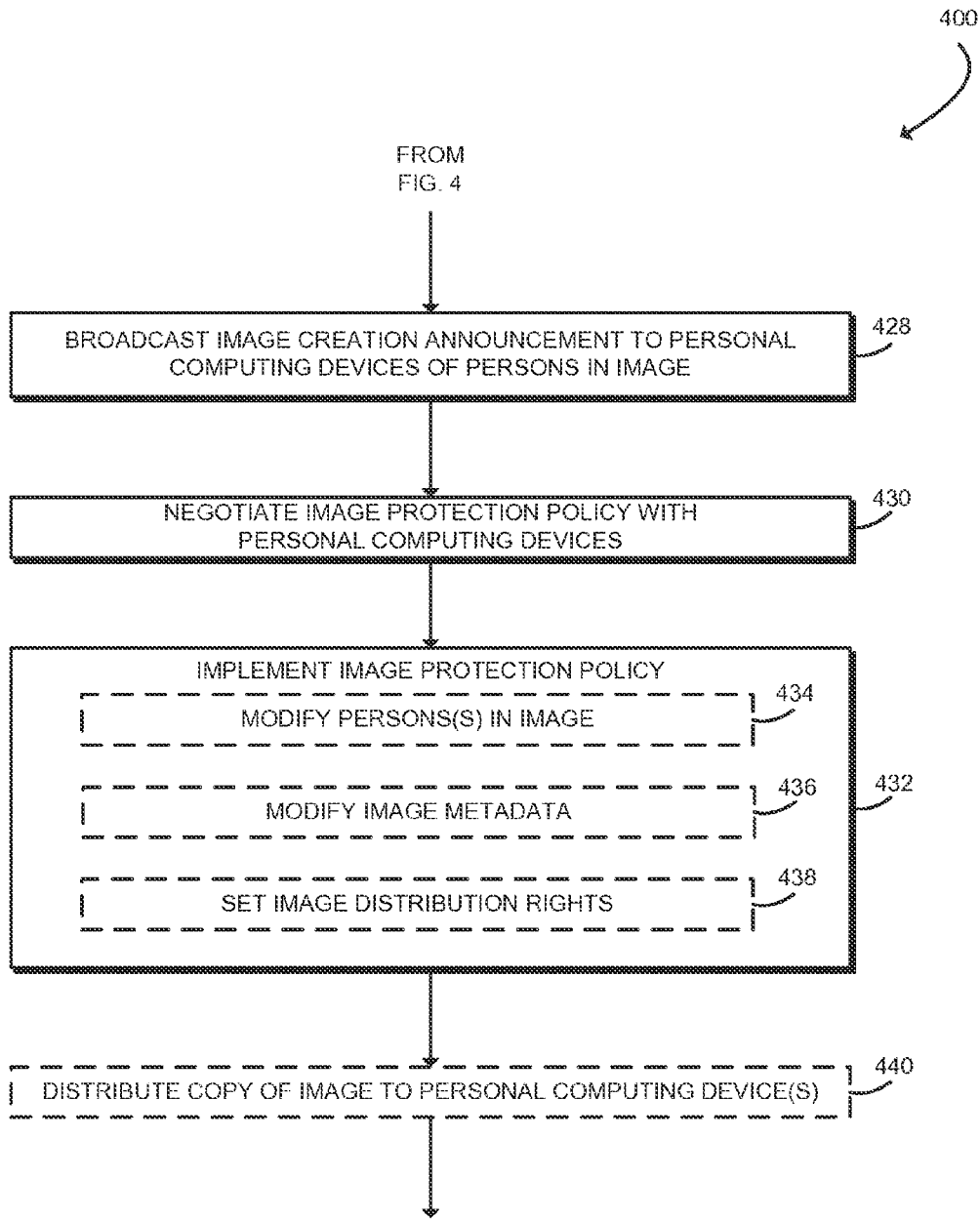
Figure 6:
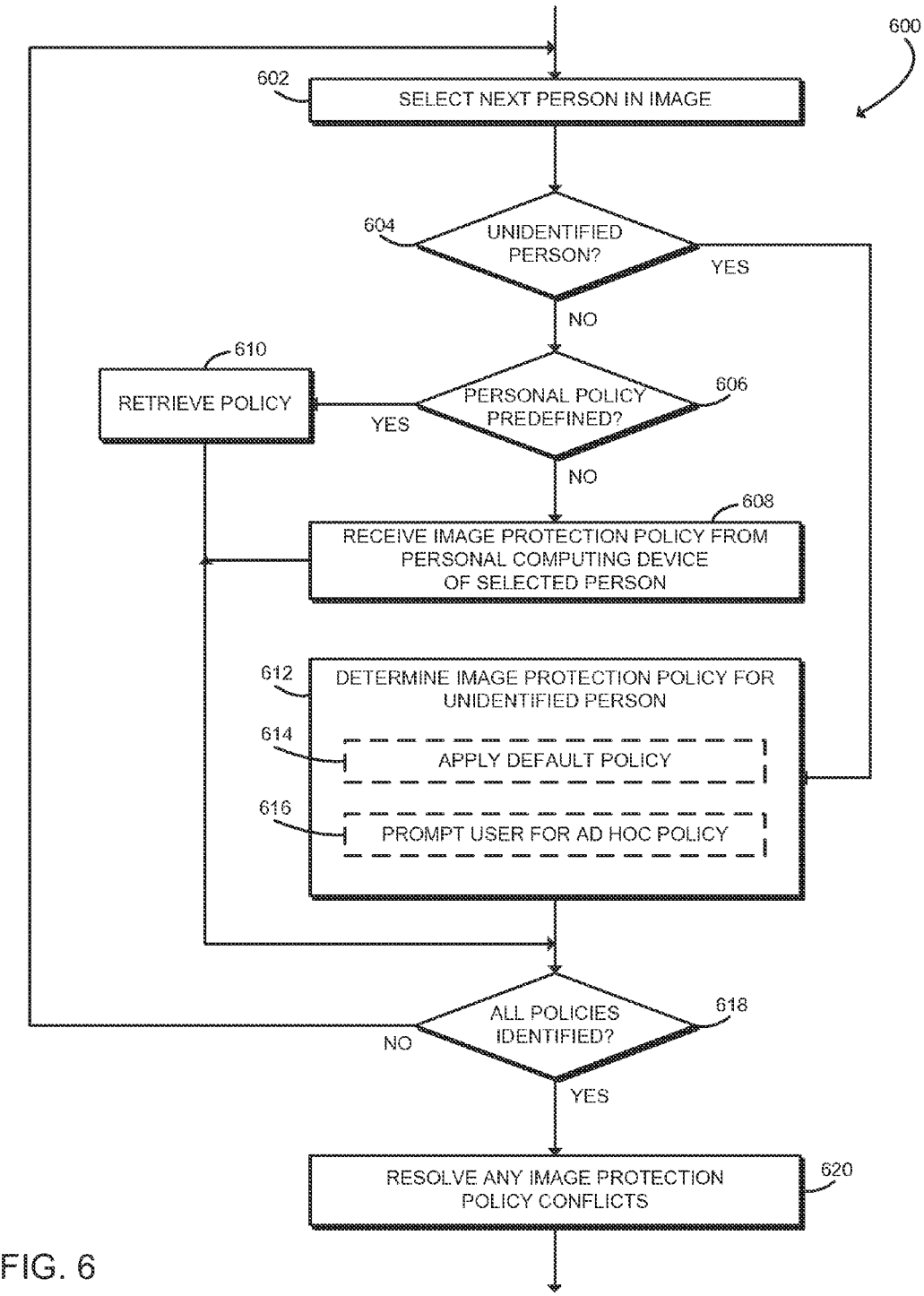
FIG. 6 is a simplified flow diagram of at least one embodiment of a method for negotiating an image protection policy with personal computing devices on the camera device of the system of FIG. 1.

After filtering the non-subject computing devices in block 426, the method 400 advances to block 428 (see FIG. 5). In block 428, the camera device 102 broadcasts an announcement of the creation of the image (i.e., that the image has been captured) to the mapped personal computing devices 106. In some embodiments, the announcement of the creation of the image may be transmitted contemporaneously with or even before the actual capturing of the image in block 404. In block 430, the camera device 102 negotiates an image protection policy with each of the mapped personal computing devices 106. To do so, the camera device 102 may execute a method 600 for negotiating an image protection policy with the personal computing devices 106 as shown in FIG. 6. That is, the camera device 102 determines the image protection policies for each of the personal computing devices 106 in the image and resolves any image protection policy conflicts.

The illustrative method 600 begins with block 602 in which the camera device 102 selects the next person 204 in the image. In block 604, the camera device 102 determines whether the selected person 204 is an unidentified person. In other words, the camera device 102 determines whether the person 204 is one that is not mapped to a personal computing device 106 (e.g., the person 204(D) of FIG. 1). If so, the camera device 102 determines an image protection policy for the unidentified person in block 612. In doing so, the camera device 102 may apply a default image protection policy in block 614. The default image protection policy may be embodied as any type of image protection policy. For example, the default image protection policy may be a low protection policy (e.g., no protection) or high protection policy (e.g., blur face or remove person from image). Alternatively, in other embodiments, the camera device 102 may prompt the user of the camera device 102 to select an ad hoc image protection policy for the selected personal computing device 106 in block 616. For example, the camera device 102 may present a menu of available image protection policies or policy features to the user 202 of the camera device 102 to allow the user 202 to select a policy or policy feature therefrom.

Referring back to block 604, if the selected person 204 has been identified (i.e., mapped to a personal computing device 106 or otherwise mapped to an image protection policy), the camera device 102 determines whether the personal policy is predefined in block 606. If so, the camera device 102 retrieves the policy from the policy database 314 in block 610. Otherwise, the camera device 102 receives the image protection policy of the personal computing device 106 from the selected personal computing device 106 in block 608. In block 618, the camera device 102 determines whether the image protection policies for all of the persons 204 have been identified. If not, the method 600 returns to block 602 in which the camera device 102 selects the next subject captured in the image. If all policies have been identified, the camera device 102 resolves any image protection policy conflicts among the subject policies in block 620. In other words, the camera device 102 attempts to reconcile any differences between the image protection policies received from the personal computing devices 106. In doing so, the camera device 102 may perform any suitable conflict resolution process. For example, the camera device 102 may simply default to either the most or the least private/secure of the conflicting policies in some embodiments. In other embodiments, the camera device 102 may prompt the user (e.g., via a menu) to choose between the conflicting image protection policies.

Referring back to FIG. 5, in block 432, the camera device 102 may implement the resultant negotiated image protection policy in block 432. It should be appreciated that the resultant image protection policy may vary depending on the responses of the personal computing devices 106. As such, the negotiated image protection policy may be implemented individually for each person. As such, in block 434, the camera device 102 may modify one or more of the persons 204 in the image. For example, the face of the person(s) 104 may be removed or blurred. Alternatively, in some embodiments, the person 204 may be replaced by the background of the image so as to remove the person from the image. Additionally or alternatively, in block 436, the camera device 102 may modify the image metadata, for example, to remove or otherwise modify GPS data, location data, or other data. In block 438, in some embodiments, the camera device 102 may set the image distribution rights of the image. For example, the camera device 102 may limit who can receive the image, how it is delivered, whether it can be copied, and so forth. In some embodiments, the camera device 102 may encrypt the image and distribute decryption keys to the personal computing devices 106, so that only authorized devices are able to view the image. Additionally, in some embodiments, the camera device 102 may distribute (e.g., transmit) a copy of the protected image (i.e., the image produced based on the captured image and the resultant negotiated image protection policy) to one or more of the personal computing devices 106.

Figure 7:
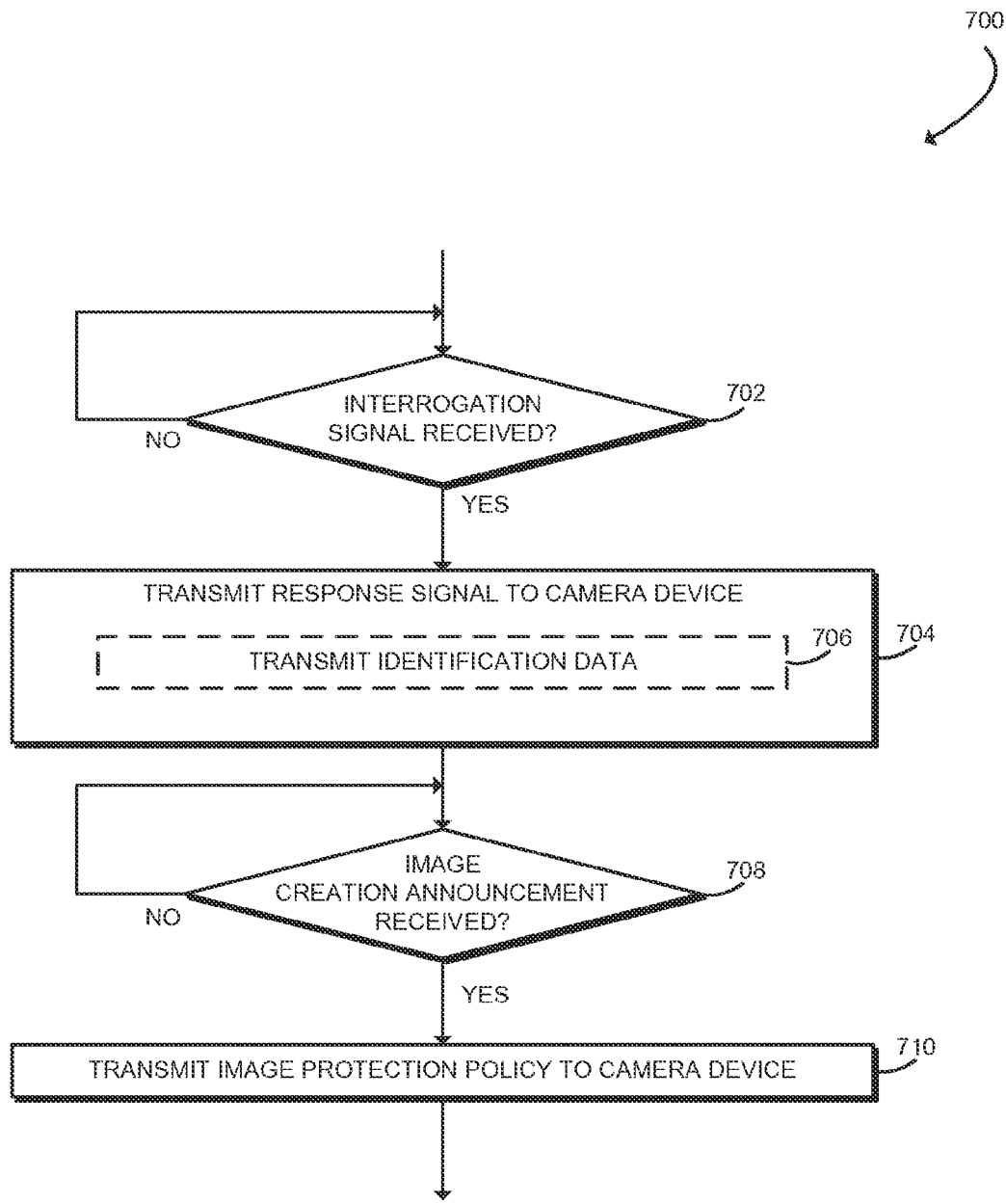
FIG. 7 is a simplified flow diagram of at least one embodiment of a method for interacting with the camera device on a personal computing device of the system of FIG. 1 to dynamically implement an image protection policy.

Referring now to FIG. 7, in use, each of the personal computing devices 106 of the system 100 may execute a method 700 for interacting with the camera device 102 to dynamically implement an image protection policy. The illustrative method 700 begins with block 702 in which the personal computing device 106 determines whether an interrogation signal has been received from the camera device 102. If so, the personal computing device 106 transmits a response signal to the camera device 102 in block 704. In doing so, the personal computing device 106 may transmit identification data regarding the owner of the personal computing device 106 and/or the personal computing device 106 itself. In block 708, the camera device 102 determines whether an announcement of creation of an image has been received by the personal computing device 106. In block 710, the personal computing device 106 may transmit an image protection policy of the personal computing device 106 to the camera device 102.

Figure 9:
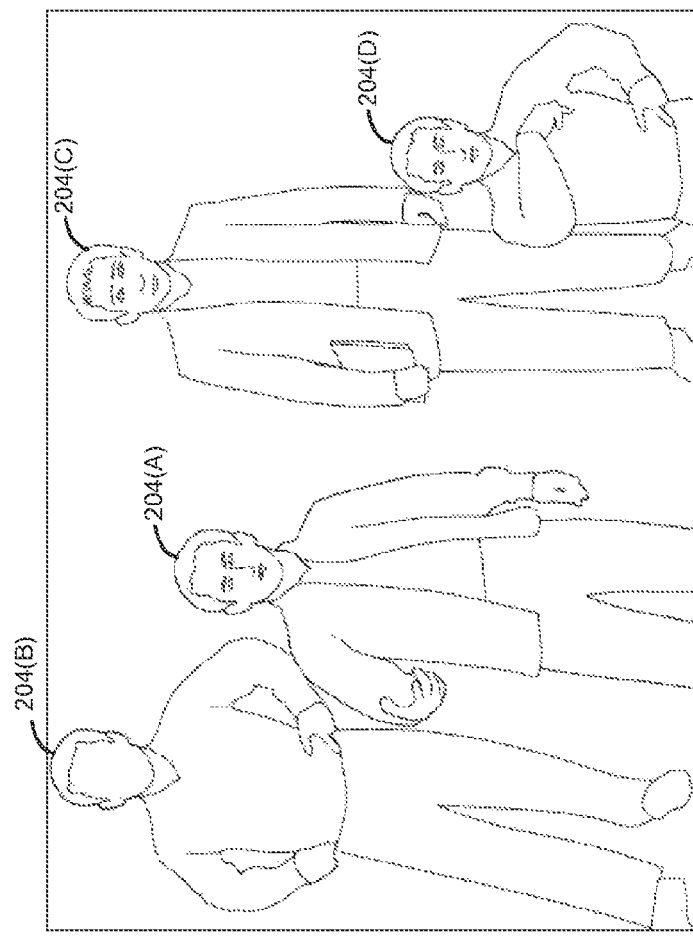
FIG. 9 is at least one embodiment of an image produced by the camera device of FIG. 1 based on a captured image and a negotiated image protection policy.

As discussed above, the camera device 102 generates a mapping between the personal computing devices 106 and the persons 204 captured in the image and negotiates an image protection policy with each mapped personal computing device 106. In some embodiments, the camera device 102 may generate a data structure or chart 800 of a resultant image protection policy and associated person and personal device mappings including a list 802 of the persons 204 in the image, a list 804 of the locations of the persons 204 and personal computing devices 106, a list 806 of the personal computing devices 106, a list 808 of the image protection policies, and a resultant image protection policy 810. It should be appreciated that the illustrative chart 800 corresponds to the persons 204 and the personal computing devices 106 shown in FIG. 1. As shown, the list 804 of locations includes the locations X, Y, Z, and W. In the illustrative embodiments, those locations are relative to the camera device 102 but may be absolute locations in other embodiments. As shown, the person 204(A) has been mapped to the personal computing device 106(B) as they have the same location, X, relative to the camera device 102. Further, the policy for the person 204(A) is open (i.e., has no restrictions). That is, the image protection policy of person 204(A) does not impute any restrictions to the use of the captured image. Additionally, the person 204(B) has been mapped to the personal computing device 106(A) with a policy of blurring the person 204(B) in the image. The person 204(C) has been mapped to the personal computing device 106(C) with a policy of sending a copy of the protected image to the personal computing device 106(C). Further, as shown, the person 204(D) is not mapped to a personal computing device 106 as one was not detected in the same approximate location. Accordingly, in the illustrative embodiment, the camera device 102 assigned an open default policy (i.e., no restrictions). A resultant protected image 900 based on the mappings shown in FIG. 8 is shown in FIG. 9. The protected image 900 includes the four persons 204(A)-(D) that are within in the field of view 206 of the camera device 102 in FIG. 1. Additionally, the protected image 900 illustrates that the face of the person 204(B) has been blurred which is consistent with the resultant image protection policy 810 as shown in the chart 800 of FIG. 8.

EXAMPLES

Illustrative examples of the technologies disclosed herein are provided below. An embodiment of the technologies may include any one or more, and any combination of, the examples described below.

Example 1 includes a camera device for dynamically implementing an image protection policy, the camera device comprising a camera to capture an image; a subject identification module to (i) determine an image location in the image of at least one person captured in the image, (ii) determine a device location, relative to the camera device, of at least one personal computing device within a communication range and a field of view of the camera device; and (iv) map each of the at least one personal computing devices to one of the at least one person captured in the image based on the device location of the corresponding personal computing device and the image location of the corresponding person; a communication module to broadcast an announcement of the creation of the image; and an image policy module to (i) negotiate an image protection policy with each of the at least one personal computing devices in response to the announcement and (ii) implement the negotiated image protection policy.

Example 2 includes the subject matter of Example 1, and wherein the camera comprises at least two lenses, each of the at least two lenses having a separate image sensor; and wherein to determine the image location comprises to determine an image location based on the output of the separate image sensors.

Example 3 includes the subject matter of any of Examples 1 and 2, and wherein to determine the image location in the image of the at least one person comprises to (i) identify the number of persons captured in the image and (ii) determine an image location of each person captured in the image relative to each other.

Example 4 includes the subject matter of any of Examples 1-3, and wherein the subject identification module is further to determine the identity of the one of the at least one person captured in the image.

Example 5 includes the subject matter of any of Examples 1-4, and wherein to determine the identity of the one of the at least one person captured in the image comprises to perform a facial recognition analysis on the one of the at least one person captured in the image.

Example 6 includes the subject matter of any of Examples 1-5, and wherein to determine the device location of the at least one personal computing device comprises to (i) transmit at least one interrogation signal to the at least one personal computing device, (ii) receive a response signal from the at least one personal computing device, and (iii) determine a location of the at least one personal computing device, relative to the camera device, as a function of the received response signals.

Example 7 includes the subject matter of any of Examples 1-6, and wherein the subject identification module comprises a radio frequency identification circuit to transmit an interrogation signal to cause the at least one personal computing device to generate the response signal.

Example 8 includes the subject matter of any of Examples 1-7, and wherein to transmit the at least one interrogation signal comprises to broadcast a signal to generate a response from personal computing devices within communication range of the camera device.

Example 9 includes the subject matter of any of Examples 1-8, and wherein the subject identification module is further to ignore response signals received from personal computing devices outside of the field of view of the camera device.

Example 10 includes the subject matter of any of Examples 1-9, and wherein to negotiate the image protection policy comprises to (i) receive an image protection policy for at least one person in the image to which a personal computing device is mapped and (ii) assign an image protection policy for an additional person captured in the image to which a personal computing device is not mapped.

Example 11 includes the subject matter of any of Examples 1-10, and wherein to assign the assigned image protection policy for the additional person captured in the image to which a personal computing device is not mapped comprises to apply a default image protection policy for the additional person captured in the image.

Example 12 includes the subject matter of any of Examples 1-11, and wherein to assign the assigned image protection policy for the additional person captured in the image to which a personal computing device is not mapped comprises to prompt a user of the camera device to identify an ad hoc image protection policy for the at least one person captured in the image.

Example 13 includes the subject matter of any of Examples 1-12, and wherein to receive the image protection policy for the at least one person captured in the image to which a personal computing device is mapped comprises to retrieve an image protection policy for the at least one person previously stored on the camera device in response to a previous interaction with a personal computing device mapped to the at least one person.

Example 14 includes the subject matter of any of Examples 1-13, and wherein to assign the image protection policy for the additional person captured in the image to which a personal computing device is not mapped comprises to assign an image protection policy for the additional person previously stored on the camera device in response to a previous interaction with a personal computing device mapped to the additional person.

Example 15 includes the subject matter of any of Examples 1-14, and wherein to negotiate the image protection policy comprises to resolve any image protection policy conflicts among the received image protection policy for each of the at least one person captured in the image.

Example 16 includes the subject matter of any of Examples 1-15, and wherein to implement the negotiated image protection policy comprises to modify a portion of the image associated with one of the at least one person captured in the image as a function of the negotiated image protection policy.

Example 17 includes the subject matter of any of Examples 1-16, and wherein to implement the negotiated image protection policy comprises to modify metadata of the captured image.

Example 18 includes the subject matter of any of Examples 1-17, and wherein to implement the negotiated image protection policy comprises to set image distribution rights for the image.

Example 19 includes the subject matter of any of Examples 1-18, and further including an antenna array, wherein to determine the device location comprises to determine the device location based on antennae signals received by at least two antennae of the antenna array.

Example 20 includes the subject matter of any of Examples 1-19, and wherein the communication module is further to distribute a copy of a protected image to one of the at least one personal computing device, the protected image produced based on the captured image and the negotiated image protection policy.

Example 21 includes a method for dynamically implementing an image protection policy on a camera device, the method comprising capturing an image with a camera of the camera device; determining, on the camera device, an image location in the image of at least one person captured in the image: determining, on the camera device, a device location, relative to the camera device, of at least one personal computing device within a communication range and a field of view of the camera device; mapping, on the camera device, each of the at least one personal computing device to one of the at least one person captured in the image based on the device location of the corresponding personal computing device and the image location of the corresponding person; broadcasting, from the camera device, an announcement of the creation of the image; negotiating, with the camera device, an image protection policy with each of the at least one personal computing device in response to broadcasting the announcement; and implementing, on the camera device, the negotiated image protection policy.

Example 22 includes the subject matter of Example 21, and wherein capturing the image comprises capturing an image using a camera having at least two lenses, each of the at least two lenses having a separate image sensor; and wherein determining the image location comprises determining an image location based on the output of the separate image sensors.

Example 23 includes the subject matter of any of Examples 21 and 22, and wherein determining the image location in the image of the at least one person comprises (i) identifying the number of persons captured in the image and (ii) determining an image location of each person captured in the image relative to each other.

Example 24 includes the subject matter of any of Examples 21-23, and further including determining, on the camera device, the identity of the one of the at least one person captured in the image.

Example 25 includes the subject matter of any of Examples 21-24, and wherein determining the identity of the one of the at least one person captured in the image comprises performing a facial recognition analysis on the one of the at least one person captured in the image.

Example 26 includes the subject matter of any of Examples 21-25, and wherein determining the device location of the at least one personal computing device comprises (i) transmitting at least one interrogation signal to the at least one personal computing device, (ii) receiving a response signal from the at least one personal computing device, and (iii) determining a location of the at least one personal computing device, relative to the camera device, as a function of the received response signals.

Example 27 includes the subject matter of any of Examples 21-26, and wherein transmitting the at least one interrogation signal comprises transmitting, with a radio frequency identification circuit of the camera device, an interrogation signal to cause the at least one personal computing device to generate the response signal.

Example 28 includes the subject matter of any of Examples 21-27, and wherein transmitting the at least one interrogation signal comprises broadcasting a signal to generate a response from personal computing devices within communication range of the camera device.

Example 29 includes the subject matter of any of Examples 21-28, and further including ignoring, on the camera device, response signals received from personal computing devices outside of the field of view of the camera device.

Example 30 includes the subject matter of any of Examples 21-29, and wherein negotiating the image protection policy comprises (i) receiving an image protection policy for at least one person captured in the image to which a personal computing device is mapped and (ii) assigning an image protection policy for an additional person captured in the image to which a personal computing device is not mapped.

Example 31 includes the subject matter of any of Examples 21-30, and wherein assigning the assigned image protection policy for the additional person captured in the image to which a personal computing device is not mapped comprises applying a default image protection policy for the additional person captured in the image.

Example 32 includes the subject matter of any of Examples 21-31, and wherein assigning the assigned image protection policy for the additional person captured in the image to a personal computing device is not mapped comprises prompting a user of the camera device to identify an ad hoc image protection policy for the additional person captured in the image.

Example 33 includes the subject matter of any of Examples 21-32, and wherein receiving the image protection policy for each of the at least one person captured in the image to which a personal computing device is mapped comprises retrieving an image protection policy for the at least one person previously stored on the camera device in response to a previous interaction with a personal computing device mapped to the at least one person.

Example 34 includes the subject matter of any of Examples 21-33, and wherein assigning the image protection policy for the additional person captured in the image to which a personal computing device is not mapped comprises assigning an image protection policy for the additional person previously stored on the camera device in response to a previous interaction with a personal computing device mapped to the additional person.

Example 35 includes the subject matter of any of Examples 21-34, and wherein negotiating the image protection policy comprises resolving any image protection policy conflicts among the received image protection policy for each of the at least one person captured in the image.

Example 36 includes the subject matter of any of Examples 21-35, and wherein implementing the negotiated image protection policy comprises modifying a portion of the image associated with one of the at least one person captured in the image as a function of the negotiated image protection policy.

Example 37 includes the subject matter of any of Examples 21-36, and wherein implementing the negotiated image protection policy comprises modifying metadata of the captured image.

Example 38 includes the subject matter of any of Examples 21-37, and wherein implementing the negotiated image protection policy comprises setting image distribution rights for the image.

Example 39 includes the subject matter of any of Examples 21-38, and wherein determining the device location comprises determining the device location based on antennae signals received by at least two antennae of the camera device.

Example 40 includes the subject matter of any of Examples 21-39, and further including distributing, with the camera device, a copy of a protected image to one of the at least one personal computing device, the protected image produced based on the captured image and the negotiated image protection policy.

Example 41 includes a computing device comprising a processor; and a memory having stored therein a plurality of instructions that when executed by the processor cause the computing device to perform the method of any of Examples 21-40.

Examples 42 includes one or more machine readable storage media comprising a plurality of instructions stored thereon that in response to being executed result in a computing device performing the method of any of Examples 21-40.

Examples 43 includes a computing device for dynamically implementing an image protection policy, the computing device comprising means for capturing an image with a camera of the computing device; means for determining an image location in the image of at least one person captured in the image; means for determining a device location, relative to the computing device, of at least one personal computing device within a communication range and a field of view of the camera of the computing device; means for mapping each of the at least one personal computing device to one of the at least one person captured in the image based on the device location of the corresponding personal computing device and the image location of the corresponding person; means for broadcasting an announcement of the creation of the image; means for negotiating an image protection policy with each of the at least one personal computing device in response to broadcasting the announcement; and means for implementing the negotiated image protection policy.

Example 44 includes the subject matter of Example 43, and wherein the means for capturing the image comprises means for capturing an image using a camera having at least two lenses, each of the at least two lenses having a separate image sensor; and wherein the means for determining the image location comprises means for determining an image location based on the output of the separate image sensors.

Example 45 includes the subject matter of any of Examples 43 and 44, and wherein the means for determining the image location in the image of the at least one person comprises (i) means for identifying the number of persons captured in the image and (ii) means for determining an image location of each person captured in the image relative to each other.

Example 46 includes the subject matter of any of Examples 43-45, and further including means for determining the identity of the one of the at least one person captured in the image.

Example 47 includes the subject matter of any of Examples 43-46, and wherein the means for determining the identity of the one of the at least one person captured in the image comprises means for performing a facial recognition analysis on the one of the at least one person captured in the image.

Example 48 includes the subject matter of any of Examples 43-47, and, wherein the means for determining the device location of the at least one personal computing device comprises (i) means for transmitting at least one interrogation signal to the at least one personal computing device, (ii) means for receiving a response signal from the at least one personal computing device, and (iii) means for determining a location of the at least one personal computing device, relative to the computing device, as a function of the received response signals.

Example 49 includes the subject matter of any of Examples 43-48, and wherein the means for transmitting the at least one interrogation signal comprises means for transmitting, with a radio frequency identification circuit of the computing device, an interrogation signal to cause the at least one personal computing device to generate the response signal.

Example 50 includes the subject matter of any of Examples 43-49, and wherein the means for transmitting the at least one interrogation signal comprises means for broadcasting a signal to generate a response from personal computing devices within communication range of the computing device.

Example 51 includes the subject matter of any of Examples 43-50, and further including means for ignoring response signals received from personal computing devices outside of the field of view of the camera of the computing device.

Example 52 includes the subject matter of any of Examples 43-51, and wherein the means for negotiating the image protection policy comprises (i) means for receiving an image protection policy for at least one person captured in the image to which a personal computing device is mapped and (ii) means for assigning an image protection policy for an additional person captured in the image to which a personal computing device is not mapped.

Example 53 includes the subject matter of any of Examples 43-52, and wherein the means for assigning the assigned image protection policy for the additional person captured in the image to which a personal computing device is not mapped comprises means for applying a default image protection policy for the additional person captured in the image.

Example 54 includes the subject matter of any of Examples 43-53, and wherein the means for assigning the assigned image protection policy for the additional person captured in the image to a personal computing device is not mapped comprises means for prompting a user of the computing device to identify an ad hoc image protection policy for the additional person captured in the image.

Example 55 includes the subject matter of any of Examples 43-54, and wherein the means for receiving the image protection policy for each of the at least one person captured in the image to which a personal computing device is mapped comprises means for retrieving an image protection policy for the at least one person previously stored on the computing device in response to a previous interaction with a personal computing device mapped to the at least one person.

Example 56 includes the subject matter of any of Examples 43-55, and wherein the means for assigning the image protection policy for the additional person captured in the image to which a personal computing device is not mapped comprises means for assigning an image protection policy for the additional person previously stored on the computing device in response to a previous interaction with a personal computing device mapped to the additional person.

Example 57 includes the subject matter of any of Examples 43-56, and wherein the means for negotiating the image protection policy comprises means for resolving any image protection policy conflicts among the received image protection policy for each of the at least one person captured in the image.

Example 58 includes the subject matter of any of Examples 43-57, and wherein the means for implementing the negotiated image protection policy comprises means for modifying a portion of the image associated with one of the at least one person captured in the image as a function of the negotiated image protection policy.

Example 59 includes the subject matter of any of Examples 43-58, and wherein the means for implementing the negotiated image protection policy comprises means for modifying metadata of the captured image.

Example 60 includes the subject matter of any of Examples 43-59, and wherein the means for implementing the negotiated image protection policy comprises means for setting image distribution rights for the image.

Example 61 includes the subject matter of any of Examples 43-60, and wherein the means for determining the device location comprises means for determining the device location based on antennae signals received by at least two antennae of the computing device.

Example 62 includes the subject matter of any of Examples 43-61, and further including means for distributing a copy of a protected image to one of the at least one personal computing device, the protected image produced based on the captured image and the negotiated image protection policy.

Example 63 includes a personal computing device for dynamic implementing an image protection policy, the personal computing device comprising a communication module to (i) receive an interrogation signal from a camera device, (ii) transmit a response signal to the camera device in response to receipt of the interrogation signal, (iii) receive an image creation announcement from the camera device, and (iv) transmit an image protection policy of the personal computing device to the camera device in response to receipt of the image creation announcement.

Example 64 includes the subject matter of Example 63, and wherein the response signal includes identification data indicative of an identity of a person owning the personal computing device.

Example 65 includes a method for dynamic implementing an image protection policy using a personal computing device, the method comprising receiving, with the personal computing device, an interrogation signal from a camera device; transmitting, from the personal computing device, a response signal to the camera device in response to receiving the interrogation signal; receiving, with the personal computing device, an image creation announcement from the camera device; and transmitting, from the personal computing device and to the camera device, an image protection policy of the personal computing device in response to receiving the image creation announcement.

Example 66 includes the subject matter of Example 65, and wherein transmitting the response signal comprises transmitting identification data indicative of an identity of a person owning the personal computing device.

Example 67 includes a computing device comprising a processor; and a memory having stored therein a plurality of instructions that when executed by the processor cause the computing device to perform the method of any of Examples 65 and 66.

Example 68 includes one or more machine readable storage media comprising a plurality of instructions stored thereon that in response to being executed result in a computing device performing the method of any of Examples 65 and 66.

Example 69 includes a computing device for dynamic implementing an image protection policy using a personal computing device, the computing device comprising means for receiving an interrogation signal from a camera device: means for transmitting a response signal to the camera device in response to receiving the interrogation signal; means for receiving an image creation announcement from the camera device; and means for transmitting an image protection policy of the personal computing device to the camera device in response to receiving the image creation announcement.

Example 70 includes the subject matter of Example 69, and wherein the means for transmitting the response signal comprises means for transmitting identification data indicative of an identity of a person owning the personal computing device.

The invention claimed is:

1. A camera device for dynamically implementing an image protection policy, the camera device comprising: a camera to capture an image; a subject identification module to (i) determine an image location in the image of at least one person captured in the image, (ii) determine a device location, relative to the camera device, of at least one personal computing device within a communication range and a field of view of the camera device; and (iv) map each of the at least one personal computing devices to one of the at least one person captured in the image based on the device location of the corresponding personal computing device and the image location of the corresponding person; a communication module to broadcast an announcement of the creation of the image; and an image policy module to (i) negotiate an image protection policy with each of the at least one personal computing devices in response to the announcement and (ii) implement the negotiated image protection policy.

2. The camera device of claim 1, wherein the camera comprises at least two lenses, each of the at least two lenses having a separate image sensor; and wherein to determine the image location comprises to determine an image location based on the output of the separate image sensors.

3. The camera device of claim 1, wherein to determine the image location in the image of the at least one person comprises to (i) identify the number of persons captured in the image and (ii) determine an image location of each person captured in the image relative to each other.

4. The camera device of claim 1, wherein to determine the device location of the at least one personal computing device comprises to (i) transmit at least one interrogation signal to the at least one personal computing device, (ii) receive a response signal from the at least one personal computing device, and (iii) determine a location of the at least one personal computing device, relative to the camera device, as a function of the received response signals.

5. The camera device of claim 4, wherein the subject identification module comprises a radio frequency identification circuit to transmit an interrogation signal to cause the at least one personal computing device to generate the response signal.

6. The camera device of claim 4, wherein the subject identification module is further to ignore response signals received from personal computing devices outside of the field of view of the camera device.

7. The camera device of claim 1, wherein to negotiate the image protection policy comprises to (i) receive an image protection policy for at least one person captured in the image to which a personal computing device is mapped and (ii) assign an image protection policy for an additional person captured in the image to which a personal computing device is not mapped.

8. The camera device of claim 7, wherein to negotiate the image protection policy comprises to resolve any image protection policy conflicts among the received image protection policy for each of the at least one person captured in the image.

9. The camera device of claim 1, wherein to implement the negotiated image protection policy comprises to modify at least one of (i) a portion of the image associated with one of the at least one person captured in the image as a function of the negotiated image protection policy, (ii) metadata of the captured image, and (iii) image distribution rights for the image.

10. The camera device of claim 1, further comprising an antenna array, wherein to determine the device location comprises to determine the device location based on antennae signals received by at least two antennae of the antenna array.

11. One or more non-transitory machine-readable storage media comprising a plurality of instructions stored thereon that, in response to execution by a computing device, cause the computing device to: capture an image with a camera of the computing device; determine an image location in the image of at least one person captured in the image; determine a device location, relative to the computing device, of at least one personal computing device within a communication range and a field of view of the computing device; map each of the at least one personal computing device to one of the at least one person captured in the image based on the device location of the corresponding personal computing device and the image location of the corresponding person; broadcast an announcement of the creation of the image;

negotiate an image protection policy with each of the at least one personal computing device in response to broadcasting the announcement; and implement the negotiated image protection policy.

12. The one or more non-transitory machine-readable storage media of claim 11, wherein to determine the image location in the image of the at least one person comprises to (i) identify the number of persons captured in the image and (ii) determine an image location of each person captured in the image relative to each other.

13. The one or more non-transitory machine-readable storage media of claim 11, wherein the plurality of instructions further cause the computing device to perform a facial recognition analysis on the one of the at least one person captured in the image to determine the identity of the one of the at least one person captured in the image.

14. The one or more non-transitory machine-readable storage media of claim 11, wherein to determine the device location of the at least one personal computing device comprises to (i) transmit at least one interrogation signal to the at least one personal computing device, (ii) receive a response signal from the at least one personal computing device, and (iii) determine a location of the at least one personal computing device, relative to the computing device, as a function of the received response signals.

15. The one or more non-transitory machine-readable storage media of claim 14, wherein to transmit the at least one interrogation signal comprises to broadcast a signal to generate a response from personal computing devices within communication range of the computing device.

16. The one or more non-transitory machine-readable storage media of claim 14, wherein the plurality of instructions further cause the computing device to ignore response signals received from personal computing devices outside of the field of view of the computing device.

17. The one or more non-transitory machine-readable storage media of claim 11, wherein to negotiate the image protection policy comprises to (i) receive an image protection policy for at least one person captured in the image to which a personal computing device is mapped and (ii) assign an image protection policy for an additional person captured in the image to which a personal computing device is not mapped.

18. The one or more non-transitory machine-readable storage media of claim 17, wherein to assign the image protection policy for the additional person captured in the image to which a personal computing device is not mapped comprises to assign an image protection policy for the additional person previously stored on the computing device in response to a previous interaction with a personal computing device mapped to the additional person.

19. The one or more non-transitory machine-readable storage media of claim 11, wherein to implement the negotiated image protection policy comprises to modify at least one of: (i) a portion of the image associated with one of the at least one person captured in the image as a function of the negotiated image protection policy, (ii) metadata of the captured image, and image distribution rights for the image.

20. A method for dynamically implementing an image protection policy on a camera device, the method comprising: capturing an image with a camera of the camera device; determining, on the camera device, an image location in the image of at least one person captured in the image; determining, on the camera device, a device location, relative to the camera device, of at least one personal computing device within a communication range and a field of view of the camera device; mapping, on the camera device, each of the at least one personal computing device to one of the at least one person captured in the image based on the device location of the corresponding personal computing device and the image location of the corresponding person;

broadcasting, from the camera device, an announcement of the creation of the image;

negotiating, with the camera device, an image protection policy with each of the at least one personal computing device in response to broadcasting the announcement; and implementing, on the camera device, the negotiated image protection policy.

21. The method of claim 20, wherein determining the image location in the image of the at least one person comprises (i) identifying the number of persons captured in the image and (ii) determining an image location of each person captured in the image relative to each other.

22. The method of claim 20, wherein determining the device location of the at least one personal computing device comprises (i) transmitting at least one interrogation signal to the at least one personal computing device, (ii) receiving a response signal from the at least one personal computing device, and (iii) determining a location of the at least one personal computing device, relative to the camera device, as a function of the received response signals.

23. The method of claim 22, further comprising ignoring, on the camera device, response signals received from personal computing devices outside of the field of view of the camera device.

24. The method of claim 20, wherein negotiating the image protection policy comprises (i) receiving an image protection policy for at least one person captured in the image to which a personal computing device is mapped and (ii) assigning an image protection policy for an additional person captured in the image to which a personal computing device is not mapped.

25. The method of claim 20, wherein implementing the negotiated image protection policy comprises modifying at least one of: (i) a portion of the image associated with one of the at least one person captured in the image as a function of the negotiated image protection policy, (ii) metadata of the captured image, and (iii) image distribution rights for the image.

* * * * *